US011853761B2

(12) United States Patent
Chovel et al.

(10) Patent No.: US 11,853,761 B2
(45) Date of Patent: Dec. 26, 2023

(54) SIMILARITY SCORES OF RULES IN INFORMATION TECHNOLOGY WORKFLOWS

(71) Applicant: ENTIT SOFTWARE LLC, Sanford, NC (US)

(72) Inventors: Shlomi Chovel, Yehud (IL); Hava Babay Adi, Yehud (IL); Rotem Chen, Yehud (IL); Ran Biron, Yehud (IL); Olga Tubman, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 637 days.

(21) Appl. No.: 16/079,738

(22) PCT Filed: Feb. 26, 2016

(86) PCT No.: PCT/US2016/019808
§ 371 (c)(1),
(2) Date: Aug. 24, 2018

(87) PCT Pub. No.: WO2017/146728
PCT Pub. Date: Aug. 31, 2017

(65) Prior Publication Data
US 2019/0050229 A1    Feb. 14, 2019

(51) Int. Cl.
*G06F 40/194* (2020.01)
*G06F 9/30* (2018.01)

(52) U.S. Cl.
CPC ........ *G06F 9/30076* (2013.01); *G06F 40/194* (2020.01)

(58) Field of Classification Search
None
See application file for complete search history.

(56) References Cited

U.S. PATENT DOCUMENTS

| 7,792,838 | B2 | 9/2010 | Ranganathan et al. |
| 8,020,191 | B2 | 9/2011 | Bertino et al. |
| 2010/0043002 | A1* | 2/2010 | Fujiwara ............ H04N 1/32106 718/102 |
| 2010/0305997 | A1* | 12/2010 | Ananian ............ G06Q 10/0633 715/843 |
| 2012/0116836 | A1 | 5/2012 | Flores |

(Continued)

FOREIGN PATENT DOCUMENTS

| WO | WO-2014028303 A1 * | 2/2014 | ............ G06Q 10/06 |
| WO | WO2015022009 A1 | 2/2015 | |

OTHER PUBLICATIONS

Z. Li et al., "CCTEST: Testing and Repairing Code Completion Systems," 2023, IEEE/ACM 45th International Conference on Software Engineering (ICSE), pp. 1238-1250 (Year: 2023).*

(Continued)

*Primary Examiner* — Amanda Gurski
(74) *Attorney, Agent, or Firm* — Sheridan Ross P.C.

(57) ABSTRACT

In some examples, first segment of computer language text in a first rule in IT workflow data and a second segment of computer language text in a second rule in the IT workflow data may be identified. In some examples, a similarity score may be determined between the first and the second rules based on a comparison of the first segment with the second segment.

19 Claims, 3 Drawing Sheets

(56) References Cited

U.S. PATENT DOCUMENTS

2014/0129285 A1* 5/2014 Wu .................... G06Q 10/0633
705/7.27
2014/0236907 A1* 8/2014 Zinar .................... G06F 16/215
707/692

OTHER PUBLICATIONS

International Searching Authority., International Search Report and Written Opinion dated Nov. 25, 2016 for PCT Application No. PCT/US2016/019808 filed Feb. 26, 2016, 12 pages.

Li, Yanhuang, et al. "Similarity Measure for Security Policies in Service Provider Selection." Information Systems Security. Springer International Publishing, 2015. 227-242.

Van Dongen, Boudewijn, Remco, Dijkman, and Jan Mendling. "Measuring similarity between business process models." Advanced Information Systems Engineering. Springer Berlin Heidelberg. 2008. 19 pgs.

Pham, Quan, Reid, Jason, & Dawson, Ed, Policy Filtering with XACML, 2011, Technical Report. Information Security Institute, Queensland University of Technology. 2 pgs. Pham, Quan, Jason Reid, and Ed Dawson. "Policy filtering with XACML."(2011).

* cited by examiner

SIMILARITY SCORES OF RULES IN INFORMATION TECHNOLOGY WORKFLOWS

BACKGROUND

An information technology (IT) environment may be managed in various ways. In some examples, the IT environment may be managed by creating an IT workflow to accomplish tasks of a process in the IT environment.

BRIEF DESCRIPTION

Some examples are described with respect to the following figures.

DETAILED DESCRIPTION

Figure 1:
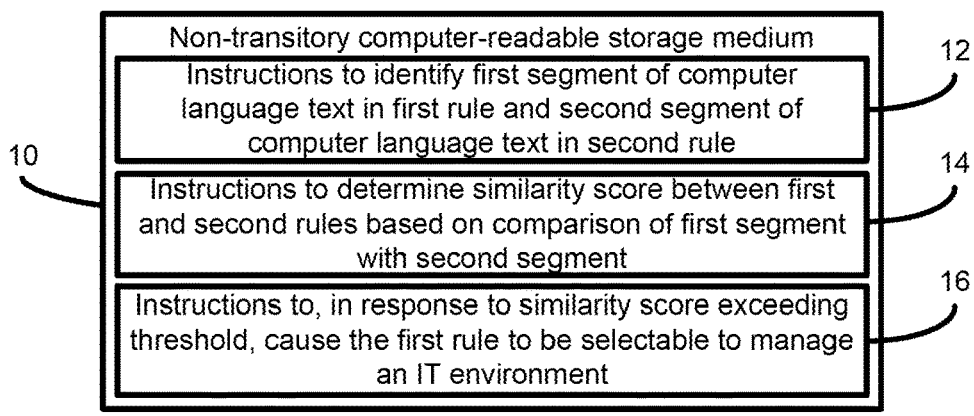
FIG. 1 is a block diagram illustrating a non-transitory computer readable storage medium according to some examples.

The following terminology is understood to mean the following when recited by the specification or the claims. The singular forms "a," "an," and "the" mean "one or more." The terms "including" and "having" are intended to have the same inclusive meaning as the term "comprising."

An IT workflow may be defined in IT workflow data, which provides a representation of a state machine that includes information on valid states (e.g. actions in an IT process) and how to transition between those states (e.g. relationships between the actions). The IT workflow may operate on an underlying system, such as an IT environment.

IT workflows may be classified into workflow types, which are based on the type of IT process to be executed in the IT workflow. For example, a workflow type may define which IT offering the IT workflow may implement. Example IT offerings include requests for IT service, requests for IT support, and requests for IT change. Other types of IT offerings may also be provided by IT workflows within the context of an IT management system, such as an information technology operations management (ITOM) system or an information technology service management (ITSM) system.

Each of the IT workflow data, based on its workflow type, may include IT workflow logic to implement its associated IT offering. In some examples, each state and transition of the IT workflow data may include IT workflow logic to run when in the state or transition. IT workflow logic may include a rule or an ordered list of rules to run when in the state or transition.

In some examples, IT workflow data representing model IT workflows may be provided, e.g. by a vendor along with IT management application. A model IT workflow may be a predetermined out-of-the-box IT workflow of a particular workflow type. Model IT workflows may implement any of the example IT offerings described earlier. For example, model IT workflow data for IT service requests may be provided.

In some examples, because some model IT workflows may be associated with broad or generic workflow types, users may wish to create a user-customized IT workflow data. In some examples, a user may create a user-customized IT workflow data, for example by modifying model IT workflow data. For example, model IT workflow data may be modified to comply with particular infrastructure requirements such as specification requirements for hardware components, and/or prior authorizations for hardware purchases, among others. In some examples, a user may add or delete IT workflow logic blocks, which may include at least one rule, into or from states and/or transitions in the IT workflow data.

In an example, an upgraded IT management application may be provided with new model IT workflow data relative those provided with a previous version of the IT management application. A user may attempt to migrate the user-customized IT workflow data used with the previous version of the IT management application so that they can be used with the upgraded IT management application. However, the user-customized IT workflow data may be similar to the new model IT workflow data provided with the upgraded IT management application.

Accordingly, the present disclosure provides examples in which a similarity score may be determined between user-customized IT workflow data and model IT workflow data. The examples include various effective methods for analyzing rules and determining similarity scores, and such methods may be used in various combinations. Therefore, in some examples, a user may use the model IT workflow data if it is sufficiently similar to the user-customized IT workflow data. In some examples, model IT workflows may be optimized for superior function relative to user-customized IT workflows, e.g. because model IT workflows may include metadata that is useful for superior function.

FIG. 1 is a block diagram illustrating a non-transitory computer readable storage medium 10 according to some examples. The non-transitory computer readable storage medium 10 may include instructions 12 executable by a processor to identify a first segment of computer language text in a first rule in IT workflow data and a second segment of computer language text in a second rule in the IT workflow data. Identification of a segment is understood herein to include either receiving the segment or parsing the rule to identify the segment. The non-transitory computer readable storage medium 10 may include instructions 14 executable by a processor to determine a similarity score between the first and the second rules based on a comparison of the first segment with the second segment. The non-transitory computer readable storage medium 10 may include instructions 16 executable by a processor to, in response to the similarity score exceeding a threshold, cause the first rule to be selectable to manage an IT environment.

Figure 2:
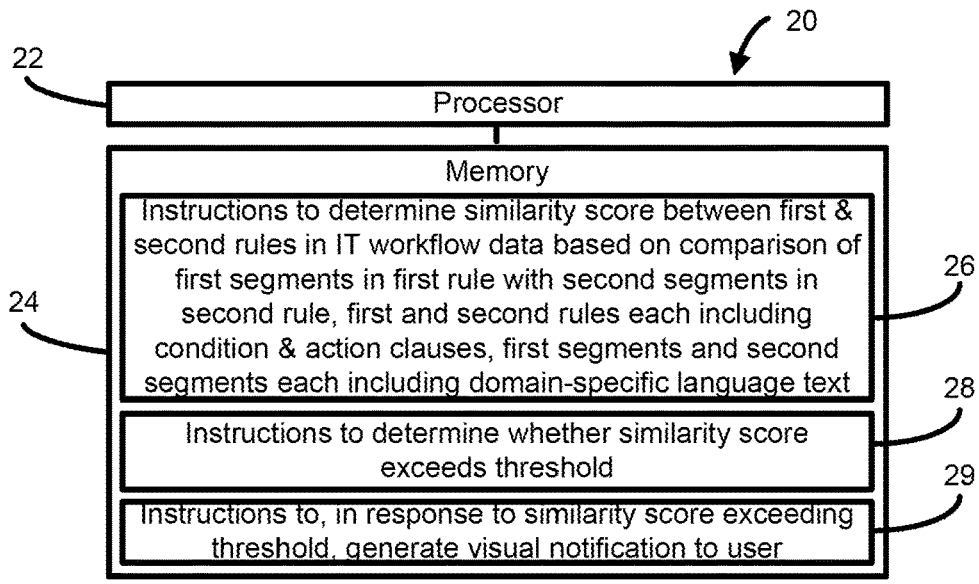
FIGS. 2 and 4 are block diagrams illustrating systems according to some examples.

FIG. 2 is a block diagram illustrating a system 20 according to some examples. The system 20 may include a processor 22 and a memory 24. The memory 24 may include instructions 26 executable by the processor to determine a similarity score between first and second rules in IT workflow data based on a comparison of first segments in the first rule with second segments in the second rule, the first and second rules each including a condition clause and an action clause, the first segments and second segments each including domain-specific language text. The memory 24 may include instructions 28 executable by the processor to determine whether the similarity score exceeds a threshold. The memory 24 may include instructions 29 executable by the processor to, in response to the similarity score exceeding the threshold, generate a visual notification to a user.

Figure 3:
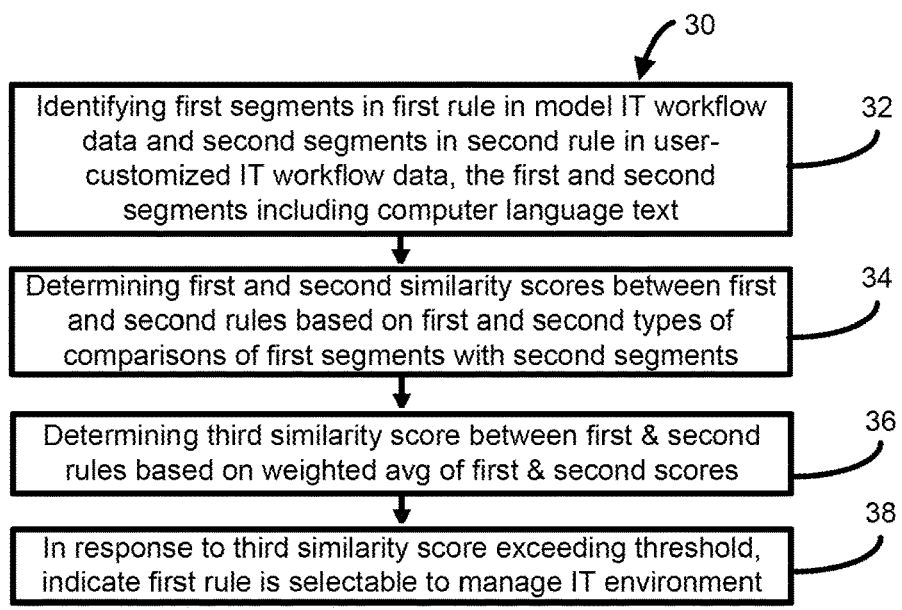
FIGS. 3 and 5 are flow diagrams illustrating methods according to some examples.

FIG. 3 is a flow diagram illustrating a method 30 according to some examples. The following may be performed by a processor. At 32, first segments in a first rule in model IT workflow data and second segments in a second rule in user-customized IT workflow data may be identified. The first and the second segments may including computer language text. At 34, first and second similarity scores may be determined between the first and the second rules based on respective first and second types of comparisons of the first segments with the second segments. At 36, a third similarity score may be determined between the first and the second rules based on a weighted average of the first and the second similarity scores. At 38, in response to the third similarity score exceeding a threshold, indicate to a user that the first rule is selectable to manage an IT environment.

Figure 4:
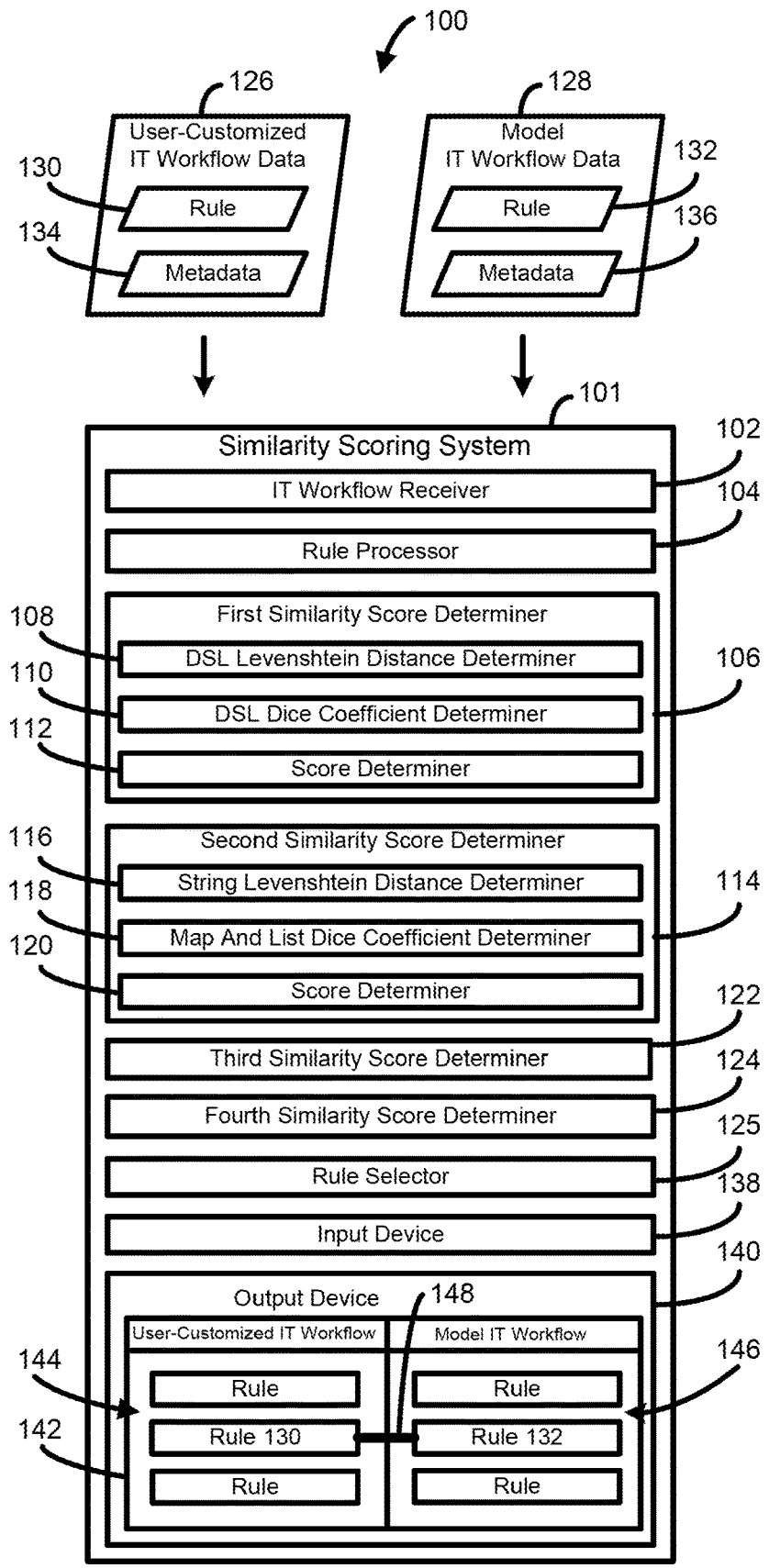

FIG. 4 is a block diagram illustrating a system 100 according to some examples. The system 100 includes a similarity scoring system 101. The similarity scoring system 101 may include an IT workflow receiver 102, rule processor 104, first similarity score determiner 106, second similarity score determiner 114, third similarity score determiner 122, fourth similarity score determiner 124, and rule selector 125. The first similarity score determiner 106 may include DSL Levenshtein distance determiner 108, DSL Dice coefficient determiner 110, and score determiner 112. The second similarity score determiner 114 may include String Levenshtein distance determiner 116, map and list Dice coefficient determiner 118, and score determiner 120. In various examples, additional elements may be added and/or some of the elements described above may be omitted.

In some examples, these components of the similarity scoring system 101 may be implemented as a computing system including a processor, a memory such as non-transitory computer readable medium coupled to the processor, and instructions such as software and/or firmware stored in the non-transitory computer-readable storage medium. The instructions may be executable by the processor to perform processes defined herein. In some examples, the components may include hardware features to perform processes described herein, such as a logical circuit, application specific integrated circuit, etc. In some examples, multiple components may be implemented using the same computing system features or hardware.

In some examples, the IT workflow receiver 102 (e.g. an application programming interface (API), such as the REST API, of the similarity scoring system 101) may receive, through a communication interface, IT workflow data 126 representing a user-customized IT workflow and IT workflow data 128 representing a model IT workflow from a data source via a communication network. The data source may be an IT management application running on a computing device in the similarity scoring system 101, such as a server in a data center, a personal computer, or the like. In other examples, the IT management application may and the similarity scoring system 101 may be included in the same computing device or system. As discussed earlier, the IT workflow data 128 representing the model IT workflow may be provided with the IT management application by a vendor, whereas the IT workflow data 126 representing the user-customized IT workflow may be created by a user for use with the IT management application. In some examples, the user may generate the IT workflow data 126 using the IT management application.

Each of the IT workflow data 126 and 128 may include IT workflow logic to implement its respective associated IT offering. As discussed earlier, in some examples, some or each of the states and transitions of each of the IT workflow data 126 and 128 may include IT workflow logic to run when in the state or transition. IT workflow logic may include a rule or an ordered list of rules to run when in the state or transition. IT workflow logic may include instructions, such as data structures or functions, which produce a part of an IT workflow. As shown in FIG. 4, the IT workflow data 126 may include rule 130 and metadata 134, and the IT workflow data 128 may include rule 132 and metadata 136.

In some examples, the rules may written in various computer languages, including combinations of different computer languages. A computer language is understood herein to be any language for communicating instructions on a computer. In some examples, some rules may include non-scripted declarative language, which is a computer language other than a scripted language and is descriptive in nature. For example, a non-scripted declarative rule may read "If a request is made for a new device, then the request must be approved by a manager." In some examples, rules may be written in a general-purpose language (GPL), which is a computer language that is applicable across domains, and may lack specialized features for a particular domain. In some examples, the rules may be written in a domain-specific language (DSL) which is a computer language that is suitable for a particular domain, such as for usage with the IT management application.

Rules are defined herein to include condition clauses and action clauses. A condition clause includes at least one logical condition to be satisfied, and an action clause includes at least one action to be performed in response to the condition being satisfied. Each of the condition clauses and action clauses may include sequences of segments drawn from several categories, including but not limited to: (1) conditional expressions, which represent logical conditions to be satisfied (e.g. in a DSL); (2) conjunctions, such as "and", "or", "xor", "if", etc.; (3) parameters, such as a variable (e.g. written as a string), a value to which the variable is to be set (e.g. in a DSL), a map parameter, and a list parameter; (4) prepositions, such as "to", etc.; and (5) actions, such as "set", "validate", etc.

In an example, Table 1 depicts the rule 130 in the IT workflow data 126 representing the model IT workflow, and Table 2 depicts the rule 132 in the IT workflow data 128 representing the user-customized IT workflow. Each of the IT workflow data 126 and 128 may include additional rules relative to respective rules 130 and 132 such that they each include an ordered list of rules.

TABLE 1

Rule 130 in IT Workflow Data 126
Representing Model IT Workflow

If ${current_update.Solution.IsChanged and
(current_update.Solution.NewValue == 'NoSuchSolution' or
entity.Category == 'Category2' || entity.Category ==
'Category1')} Set Solution to ${current_update.Solution.OldValue}

TABLE 2

Rule 132 in IT Workflow Data 128 Representing
User-Customized IT Workflow

If ${current_update.Solution.IsChanged &&
(current_update.Solution.NewValue == 'NoSuchSolution' ||
entity.Category == 'Category1')}
Set Solution to ${current_update.Solution.OldValue}

The example rule 130 states that (1) if a Solution parameter has been changed, and (2) if the changed value of the Solution is "no solution" or if the parameter associated with the IT environment (i.e. entity category) on which the IT workflow runs is of a first or second value; then the Solution parameter is to be set to its previous value (the value it had before being changed). The example rule 132 states that (1) if a Solution parameter has been changed, and (2) if the changed value of the Solution is "no solution" or if parameter associated with the IT environment (i.e. entity category) on which the IT workflow runs is of a first value; then the Solution parameter is to be set to its previous value (the value it had before being changed).

As discussed earlier, the IT workflow data 126 and 128 may include respective metadata 134 and 136, which may parse segments of the respective rules 130 and 132, and specify the category of each segment. Example parsing and categorization of each segment of the rules 130 and 132 provided by the metadata 134 and 136 are shown in Tables 3 and 4.

TABLE 3

Rule 130 and Associated Metadata 134

| | Metadata 134 | Rule 130 |
|---|---|---|
| Condition clause | Conjunction | If |
| | Conditional expression (in DSL) | ${current_update.Solution.IsChanged |
| | Conjunction | and |
| | Conditional expression (in DSL) | current_update.Solution.NewValue == 'NoSuchSolution' |
| | Conjunction | or |
| | Conditional expression (in DSL) | entity.Category == 'Category2' |
| | Conjunction | \|\| |
| | Conditional expression (in DSL) | entity.Category == 'Category1' |
| Action Clause | Action | Set |
| | Parameter (string) | Solution |
| | Preposition | to |
| | Parameter (in DSL) | ${current_update.Solution.OldValue} |

TABLE 4

Rule 132 and Associated Metadata 136

| | Metadata 136 | Rule 132 |
|---|---|---|
| Condition clause | Conjunction | If |
| | Conditional expression (in DSL) | ${current_update.Solution.IsChanged |
| | Conjunction | && |
| | Conditional expression (in DSL) | current_update.Solution.NewValue == 'NoSuchSolution' |
| | Conjunction | \|\| |
| | Conditional expression (in DSL) | entity.Category == 'Category1' |
| Action Clause | Action | Set |
| | Parameter (string) | Solution |
| | Preposition | to |
| | Parameter (in DSL) | Set |

In the examples of Tables 1-4, map and list parameters are not shown. A map parameter includes (e.g. after the action "Set") a variable and a value to which the variable is to be set, and e.g. separated by a separator such as a colon. The map parameter may include several pairs of variables and values. The map parameter may be part of an action clause. An example map parameter is "Set ExpertAssignee: ${entity.AssignedPerson} CurrentAssignment: ExpertGroup". A list parameter includes (e.g. after the action "Validate") a variable and a list of values. The list parameter may be part of an action clause. An example list parameter is "Validate that Current Assignment is in Service Desk, Expert Group, or Incident". In this example, the variable "Current Assignment" is checked to see if it has a value from the list of values "Service Desk", "Expert Group", or "Incident".

In some examples, the similarity scoring system 101 may support direct user interaction. For example, the similarity scoring system 101 may include user input device 138, such as a keyboard, touchpad, buttons, keypad, dials, mouse, track-ball, card reader, or other input devices. Additionally, the similarity scoring system 101 may include output device 140 such as a liquid crystal display (LCD), video monitor, touch screen display, a light-emitting diode (LED), or other output devices. The output devices may be responsive to instructions to display textual information or graphical data. The output device 140 may include a viewing area 142 to allow a user to view the user customized IT workflow data 126 and the model IT workflow data 128. As shown in FIG. 4, each of the IT workflows 126 and 128 is shown to include a respective ordered list 144 and 146 of three rules, with respective rules 130 and 132 in the middle of the ordered lists 144 and 146. The ordered lists 144 and 146 are provided with visual labels identifying the lists as part of either the user-customized IT workflow or the model IT workflow.

In some examples, the rule processor 104 may process the rules for use by the score determiners 106, 114, 122, and 124. For example, the rule processor 104 may identify segments that are synonyms and replace them with a single same segment. For example, the rule processor 104 may identify that the conjunctions "and" and "&&" (respectively in rule 130 and 132) as "and" and therefore replace instances of "&&" with "and". The rule processor 104 may also identify that the conjunctions "||" and "or" (in rules 130 and 132) as "or", and therefore replace instances of "||" with "or". The similarity scoring system 101 may additionally identify any other synonyms before performing similarity score analyses.

In some examples, the processing by the rule processor 104 may include identifying when similar segments, such as the DSL condition expression "entity.Category='Category1'", appear in different rules 130 and 132 in different locations, but nevertheless serve the same logical function in the rule. Upon such an identification, the rule processor 104 may determine that these segments are to form the basis of comparisons by the score determiners 106, 114, 122, and 124, which may then generate the same similarity score regardless of whether clauses and segments appear in different locations in different rules, so long as the difference in location does not contribute to any difference in the logical function of the rules.

In some examples, the processing by the rule processor 104 may include, for rules without corresponding metadata, the rule processor 104 may parse the rules by identifying clauses, segments, and spaces between segments, and generate metadata for the rules similar to that shown in Tables 3 and 4.

The similarity scoring system 101 is shown in FIG. 4 to include four similarity score determiners 106, 114, 122, and 124, but in other examples some of these similarity score determiners may be removed and/or others may be added. Therefore, the similarity scoring system 101 is flexible in that it may incorporate various types of similarity score determiners to customize the final similarity score determination. As will be discussed, several parameters such as weights to be applied to different similarity scores and other values may be predetermined or selectable by a user. In some examples, the user may save a user profile with a user customized set of weights and/or selections of which similarity score determiners to use when determining a final similarity score.

The first similarity score determiner 106 may determine a first similarity score between the rule 130 in the IT workflow data 126 and a corresponding rule 132 in the IT workflow data 128. First similarity scores may also be determined for additional rule pairs across the IT workflow data 126 and 128. The first similarity score determiner 106 may perform these processes using its DSL Levenshtein distance determiner 108, DSL Dice coefficient determiner 110, and score determiner 112. Whether rules are "corresponding" may be determined based on their respective locations in the IT workflow data 126 and 128, e.g. whether they are found within a similar or same location or context in the IT workflow data 126 and 128. However, in some examples, each rule in the IT workflow data 128 may be compared to some or all of the rules in the IT workflow data 126, such that the first similarity score determiner 106 may, for a given rule in the IT workflow data 128, find a corresponding rule in the IT workflow data 126 with a highest similarity score, as will be discussed. The following example will discuss a first similarity score determination between the rules 130 and 132, but such a determination may be made for any other rule pairs discussed above.

The DSL Levenshtein distance determiner 108 may determine the Levenshtein distance between rules 130 and 132. The Levenshtein distance between two texts is defined herein as the minimum number of single character edits (e.g. insertions, deletions, and/or substitutions) to transform between the texts. In some examples, the Levenshtein distance between the entire rules 130 and 132 may be determined. In some examples, the Levenshtein distance between respective portions of the rules 130 and 132 may be determined. In some examples, the respective portions may comprise segments (e.g. all texts or DSL texts) in the condition clauses. In some examples, the respective portions may comprise the DSL text in each of the rules 130 and 132. For example, the Levenshtein distance may be determined between the 5 DSL texts (4 DSL conditional expressions and 1 DSL parameter) in the rule 130 and the 4 DSL texts (3 DSL conditional expressions and 1 DSL parameter) in the rule 132. In some examples, the respective portions may additionally any combinations of DSL texts, strings, parameters, conditional expressions, conjunctions, actions, and/or other segments, etc. In some examples, the DSL Levenshtein distance determiner 108 may normalize the determined Levenshtein distance to a value between 0 (completely different, e.g. if every character in the first text is changed to transform to the second text) and 1 (identical, e.g. if no characters are transformed).

The DSL Dice coefficient determiner 110 may determine the Dice coefficient between rules 130 and 132. The Dice coefficient between two texts (e.g. two rules) is defined herein as twice the number of terms (e.g. segments) common to the texts being compared, divided by the total number of terms in the texts (i.e. a first number of terms in the first text plus a second number of terms in the second text). In some examples, the Dice coefficient between the entire rules 130 and 132 may be determined. In other examples, the Dice coefficient distance between respective portions of the rules 130 and 132 may be determined. In some examples, the respective portions may comprise segments (e.g. all texts or DSL texts) in the condition clauses. In some examples, the respective portions may comprise the DSL text in each of the rules 130 and 132. For example, the Dice coefficient may be determined between the 5 DSL texts (4 DSL conditional expressions and 1 DSL parameter) in the rule 130 and the 4 DSL texts (3 DSL conditional expressions and 1 DSL parameter) in the rule 132. In some examples, the respective portions may additionally any combinations of DSL texts, strings, parameters, conditional expressions, conjunctions, actions, and/or other segments, etc. The Dice coefficient may be between 0 (completely different, e.g. no common texts) and 1 (identical, e.g. all texts are common).

The score determiner 112 may determine a first similarity score based on the Levenshtein distance determined by the DSL Levenshtein distance determiner 108 and the Dice coefficient determined by the DSL Dice coefficient determiner 110. In some examples, the first similarity score may comprise a sum of a first weight a (where a is between 0 and 1) multiplied by the Levenshtein distance plus a second weight b (where b=1−a) multiplied by the Dice coefficient. In some examples, both a and b may be equal to 0.5. In some examples, the first and second weights may be predetermined or may be set by a user via the input device 138 of the similarity scoring system 101. In some examples, the score determiner 112 may add a predetermined bonus amount (e.g. 0.1 points) to the first similarity score in response to the rule of the user-customized IT workflow being completely contained (or a threshold amount of the rule is contained) within the rule of the model IT workflow. In the example of Tables 1-4, all segments of the rule 130 of the user-customized IT workflow data 126 are contained in the rule 132 of the model IT workflow data 128.

In some examples, using both the DSL Levenshtein distance determiner 108 and the DSL Dice coefficient determiner 110 for determining the first similarity score may provide a robust and reliable score. For example, the Levenshtein distance may be more accurate when the segments are different but in small part, such as "entity.x1==null" vs. "entity.x2==null". On the other hand, the Dice coefficient may be more accurate when the segments have switched places but the meaning of the segments remain identical, for example "entity.Category=='Category1'" in rules 130 and 132.

The second similarity score determiner 114 may determine a second similarity score between the rule 130 in the IT workflow data 126 and the corresponding rule 132 in the IT workflow data 128. Second similarity scores may also be determined for additional rule pairs across the IT workflow data 126 and 128. The second similarity score determiner 114 may perform these processes using its string Levenshtein distance determiner 116, map and list Dice coefficient determiner 118, and score determiner 120. However, in some examples, each rule in the IT workflow data 128 may be compared to some or all of the rules in the IT workflow data 126, such that the second similarity score determiner 114 may, for a given rule in the IT workflow data 128, find a corresponding rule in the IT workflow data 126 with a highest similarity score, as will be discussed. The following example will discuss a second similarity score determination between the rules 130 and 132, but such a determination may be made for any other rule pairs discussed above.

The string Levenshtein distance determiner 116 may determine the Levensthein distance between rules 130 and 132. In some examples, the Levenshtein distance between respective portions of the rules 130 and 132 may be determined. In some examples, the respective portions may comprise segments comprising strings (e.g. parameters written as strings) of the rules 130 and 132. For example, the strings in rules 130 and 132 may include the string parameter "Solution". In some examples, the respective portions may additionally any combinations of DSL texts, strings, parameters, conditional expressions, conjunctions, actions, and/or other segments, etc. In some examples, the string Levenshtein distance determiner 108 may normalize the determined Levenshtein distance to a value between 0 (completely different, e.g. if every character in the first text is changed to transform to the second text) and 1 (identical, e.g. if no characters are transformed).

The map and list Dice coefficient determiner 118 may determine the Dice coefficient between rules 130 and 132. In some examples, the Dice coefficient distance between respective portions of the rules 130 and 132 may be determined. In some examples, the respective portions may comprise map and/or list parameters in the rules 130 and 132. In the example of rules 130 and 132, no map and list parameters are present, however example map and list parameters such as those described earlier may be analyzed in other example rules. In some examples, the respective portions may additionally any combinations of DSL texts, strings, parameters, conditional expressions, conjunctions, actions, and/or other segments, etc. In some examples, the map and list Dice coefficient determiner 118 may add a predetermined bonus amount (e.g. 0.1 points) to the Dice coefficient in response to the map and list parameters of the user-customized IT workflow being completely contained (or a threshold amount of the map and list parameters is contained) within the rule of the model IT workflow. The Dice coefficient may be between 0 (completely different, e.g. no common texts) and 1 (identical, e.g. all texts are common).

The score determiner 120 may determine a second similarity score based on the Levenshtein distance determined by the string Levenshtein distance determiner 116, the Dice coefficient determined by the map and list Dice coefficient determiner 118, and a first similarity score determined by the first similarity score determiner 106, wherein the first similarity score may be determined by based on comparisons of DSL texts but no other texts. In some examples, the second similarity score may comprise a sum of a first weight c (where c is between 0 and 1) multiplied by the Levenshtein distance plus a second weight d (where d is between 0 and 1) multiplied by the Dice coefficient plus a third weight e (where e is between 0 and 1, and e=1−c−d) multiplied by the first similarity score. In some examples, each of c, d, and e may be equal to ⅓. In some examples, the first, second, and third weights may be predetermined or may be set by a user via the input device 138 of the similarity scoring system 101.

In some examples, using the combination of the string Levenshtein distance determiner 116, map and list Dice coefficient determiner 118, and first similarity score determiner 106 for determining the second similarity score may provide a robust and reliable score, for similar reasons as discussed earlier relative to score determiner 112.

In some examples, the first similarity score may be determined based on segments in the condition clause while the second similarity score may be determined based on segments in the action clause, in which case the first similarity score may be regarded as a condition similarity score and the second similarity score may be regarded as an action similarity score.

The third similarity score determiner 122 may determine a third similarity score between the rule 130 in the IT workflow data 126 and the rule 132 in the IT workflow data 128, based on the first similarity score determined by the score determiner 112 and the second similarity score determined by the score determiner 120. Third similarity scores may also be determined for additional rule pairs across the IT workflow data 126 and 128, for any of the pairs described earlier relative to the first and second similarity score determiners 112 and 120. In some examples, the third similarity score may comprise a sum of a first weight f (where f is between 0 and 1) multiplied by the first similarity score plus a second weight g (where g=1−f) multiplied by the second similarity score. In some examples, both f and g may be equal to 0.5. In some examples, the first and second weights may be predetermined or may be set by a user via the input device 138 of the similarity scoring system 101.

The fourth similarity score determiner 124 may determine a fourth similarity score between the rule 130 in the IT workflow data 126 and the rule 132 in the IT workflow data 128, based on a weighted average of third similarity scores of the rules pair 130 and 132 themselves and the third similarity scores of rule pairs within a threshold distance of the one of the rule pairs. In some examples, the fourth similarity score may provide for a higher similarity score when rule pairs appear in similar locations in their ordered lists.

This may increase accuracy of the scoring process.

TABLE 5

| Weight | Third Similarity Scores | IT workflow 126 | IT workflow 128 |
| --- | --- | --- | --- |
| W1 = 0 | SS_BR1 | Rule 1 | Rule 1 |
| W2 = 0.1 | SS_BR2 | Rule 2 | Rule 2 |
| W3 = 0.2 | SS_BR3 | Rule 3 | Rule 3 |
| W4 = 0.4 | SS_BR4 | Rule 4 (e.g. Rule 130) | Rule 4 (e.g. Rule 132) |
| W5 = 0.2 | SS_BR5 | Rule 5 | Rule 5 |
| W6 = 0.1 | SS_BR6 | Rule 6 | Rule 6 |
| W7 = 0 | SS_BR7 | Rule 7 | Rule 7 |

In the example of Table 5, rules 130 and 132 and additional rules in the IT workflows 126 and 128 are shown in an ordered list. Between each of the rule pairs, third similarity scores (SS_BR1 to SS_BR7) may be determined by the third similarity score determiner 122. Third similarity scores of rule pairs within a threshold distance of the rule pair 130 and 132 in the ordered lists may carry weight in the fourth similarity score determination for rules 130 and 132. In the example of Table 5, rule pairs no more than 2 pairs away from the rule pair 130 and 132 may be given weight in the fourth similarity score determination (i.e. 3 pairs away have no weight).

In some examples, the fourth similarity score between the rules 130 and 132 may comprise a sum of W2 multiplied by SS_BR2 plus W3 multiplied by SS_BR3 plus W4 multiplied by SS_BR4 plus W5 multiplied by SS_BR5 plus W6 multiplied by SS_BR6. Example values of the weights are shown in Table 5, and may sum to 1. As shown, the third similarity score for the rule pair 130 and 132 themselves may carry the most weight, and progressively more distant rule pairs may carry lesser and lesser weight, until they carry none when sufficiently distant in the ordered list. In some examples, the weights may be predetermined or may be set by a user via the input device 138 of the similarity scoring system 101.

In some examples, a similar determination of a fourth similarity score may be made for any other rule pairs discussed earlier.

In some examples, the rule selector 125 may, through the output device 140 of the similarity scoring system 101, provide a user interface indicating that a user has an option to select the rule 132 in the model IT workflow data 128 for usage by a user (rather than the rule 130 in the user-customized IT workflow data 126) in response to the fourth similarity score exceeds a threshold (e.g. a threshold of 0.75). Thus, the rule 132 may be caused to be selectable (e.g.

by a user or automatically) to manage an IT environment. In some examples, the indication may take the form of a notification in the viewing area 142 of the output device 140. In some examples, the notification may be a textual notification. As shown in FIG. 4, the notification may include a linkage 148 between the depiction of rules 130 and 132 in the viewing area 142 indicating that the rule 132 may be used.

The user may then select, using the input device 138, to use the rule 132 when running the IT workflow, and cause the IT workflow to run. In some examples, the user may replace the user-customized IT workflow with the model IT workflow entirely (e.g. if a threshold number of multiple rule pairs exceed the threshold), and run the model IT workflow to manage the IT environment. The rule selector 125 may receive the input from the input device 138. In response to the fourth similarity score not exceeding the threshold, no indication to use the rule 132 may be made. In some examples, the threshold may be predetermined or may be set by a user via the input device 138 of the similarity scoring system 101.

Figure 5:
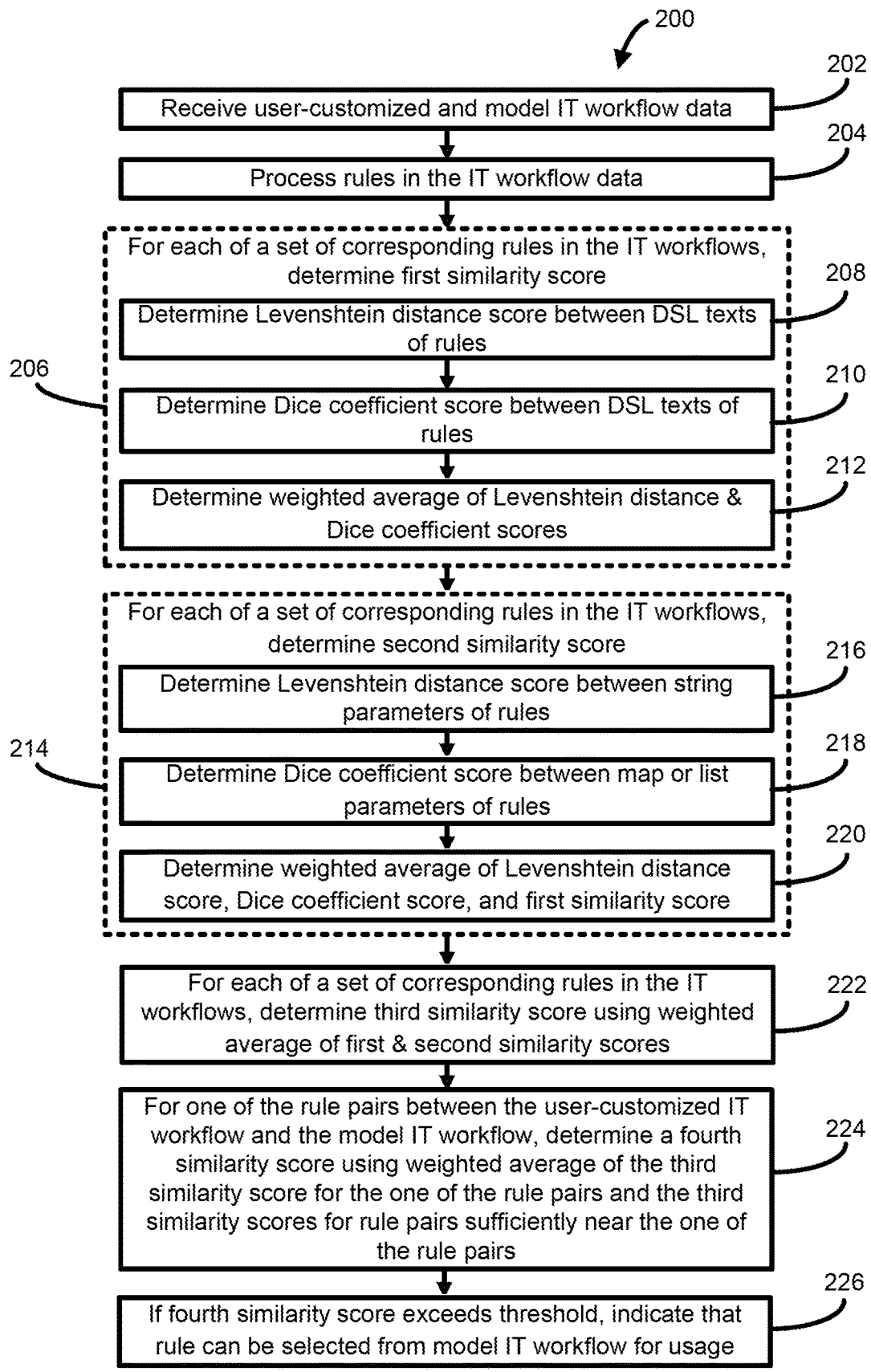

FIG. 5 is a flow diagram illustrating a method 200 according to some examples. In some examples, the orderings shown may be varied, some elements may occur simultaneously, some elements may be added, and some elements may be omitted. In describing FIG. 5, reference will be made to elements described in FIG. 4. In examples, any of the elements described earlier relative to FIG. 4 may be implemented in the process shown in and described relative to FIG. 5.

At 202, the IT workflow receiver 102 may receive IT workflow data 126 representing a user-customized IT workflow and IT workflow data 128 representing a model IT workflow. Any processes previously described as implemented by the IT workflow receiver 102 may be implemented at 202.

At 204, the rule processor 104 may process the rules for use by the score determiners 106, 114, 122, and 124. Any processes previously described as implemented by the rule processor 104 may be implemented at 204.

At 206, the first similarity score determiner 106 may determine a first similarity score between the rule 130 in the IT workflow data 126 and a corresponding rule 132 in the IT workflow data 128, using its DSL Levenshtein distance determiner 108 at 208, DSL Dice coefficient determiner 110 at 210, and score determiner 112 at 212. Any processes previously described as implemented by the first similarity score determiner 106, the DSL Levenshtein distance determiner 108, the DSL Dice coefficient determiner 110, and the score determiner 112 may be implemented at 206, 208, 210, and 212.

At 214, the second similarity score determiner 114 may determine a second similarity score between the rule 130 in the IT workflow data 126 and a corresponding rule 132 in the IT workflow data 128, using its string Levenshtein distance determiner 116 at 216, map and list Dice coefficient determiner 118 at 218, and score determiner 120 at 220. Any processes previously described as implemented by the second similarity score determiner 114, the string Levenshtein distance determiner 116, the map and list Dice coefficient determiner 118, and the score determiner 120 may be implemented at 214, 216, 218, and 220.

At 222, the third similarity score determiner 122 may determine a third similarity score between the rule 130 in the IT workflow data 126 and the rule 132 in the IT workflow data 128, based on the first similarity score determined by the score determiner 112 and the second similarity score determined by the score determiner 120. Any processes previously described as implemented by the third similarity score determiner 122 may be implemented at 222.

At 224, the fourth similarity score determiner 124 may determine a fourth similarity score between the rule 130 in the IT workflow data 126 and the rule 132 in the IT workflow data 128, based on a weighted average of third similarity scores of the rules pair 130 and 132 themselves and the third similarity scores of rule pairs sufficiently near the one of the rule pairs. Any processes previously described as implemented by the fourth similarity score determiner 124 may be implemented at 224.

At 226, the rule selector 125 may indicate that the rule 132 in the model IT workflow data 128 may be selected for usage by a user (rather than the rule 130 in the user-customized IT workflow data 126) in response to the fourth similarity score exceeding a threshold. Any processes previously described as implemented by the rule selector 125 may be implemented at 226.

Any of the processors discussed herein may comprise a microprocessor, a microcontroller, a programmable gate array, an application specific integrated circuit (ASIC), a computer processor, or the like. Any of the processors may, for example, include multiple cores on a chip, multiple cores across multiple chips, multiple cores across multiple devices, or combinations thereof. In some examples, any of the processors may include at least one integrated circuit (IC), other control logic, other electronic circuits, or combinations thereof. Any of the non-transitory computer-readable storage media described herein may include a single medium or multiple media. The non-transitory computer readable storage medium may comprise any electronic, magnetic, optical, or other physical storage device. For example, the non-transitory computer-readable storage medium may include, for example, random access memory (RAM), static memory, read only memory, an electrically erasable programmable read-only memory (EEPROM), a hard drive, an optical drive, a storage drive, a CD, a DVD, or the like.

All of the features disclosed in this specification (including any accompanying claims, abstract and drawings), and/or all of the elements of any method or process so disclosed, may be combined in any combination, except combinations where at least some of such features and/or elements are mutually exclusive.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

The invention claimed is:

1. A non-transitory computer-readable storage medium storing instructions that are executable by a processor to cause the processor to:
   receive a model workflow data of an application and a user-customized workflow data of the application, wherein the model workflow data includes a first rule, and the user-customized workflow data includes a second rule, and wherein each of the first rule and the second rule includes a condition clause and an action clause;
   identify a first segment of computer-language text in the condition clause or the action clause of the first rule in the model workflow data and a second segment of computer-language text in the condition clause or the action clause of the second rule in the user-customized workflow data;
determine a first similarity score between the first rule and the second rule, including instructions that cause the processor to:
  determine a distance between the first segment and the second segment,
  determine a coefficient between the first segment and the second segment, and
  generate a sum of the distance and the coefficient as the first similarity score between the first rule and the second rule; and
in response to the first similarity score exceeding a first threshold, cause the first rule in the model workflow data to replace the second rule in the user-customized workflow data during a running of the application.

2. The non-transitory computer-readable storage medium of claim 1, wherein the instructions are executable to cause the processor to:
receive a selection from a user to use the first rule to replace the second rule during the running of the application.

3. The non-transitory computer-readable storage medium of claim 1, wherein the distance between the first segment and the second segment is a Levenshtein distance between the first segment and the second segment, and the coefficient between the first segment and the second segment is a Dice coefficient.

4. The non-transitory computer-readable storage medium of claim 1, wherein the instructions that cause the processor to generate the sum of the distance and the coefficient include instructions that cause the processor to:
determine the first similarity score based on a weighted average of the distance and the coefficient.

5. The non-transitory computer-readable storage medium of claim 1, wherein the instructions are executable to cause the processor to:
determine a second similarity score between the first and the second rules based on a comparison of the first segment with the second segment; and
determine a third similarity score based on a weighted average of the first similarity score and the second similarity score, the similarity score being the third similarity score.

6. The non-transitory computer-readable storage medium of claim 1 wherein the instructions are executable to cause the processor to:
identify a third segment of computer-language text in a third rule in the model workflow data and a fourth segment of computer-language text in a fourth rule in the user-customized workflow data, the first rule and the third rule being part of a first ordered list of rules, the second and the fourth rule being part of a second ordered list of rules
determine a second similarity score between the third and fourth rules based on a comparison of the third segment with the fourth segment; and
in response to the third and the fourth rules being within a threshold distance from the first and the second rules in the first and the second ordered lists of rules, determine a third similarity score based on a weighted average of the first similarity score and the second similarity score, wherein the third similarity score is compared to the first threshold to determine whether to use the first rule in the model workflow data to replace the second rule in the user-customized workflow data.

7. The non-transitory computer-readable storage medium of claim 1 wherein the instructions to identify the first segment and the second segment comprise instructions to:
parse the first rule and the second rule to identify the first segment and the second segment, respectively; and
categorize the first segment and the second segment.

8. The non-transitory computer-readable storage medium of claim 1, wherein the instructions are executable to cause the processor to:
generate, on a user interface, a visual representation of the model workflow data comprising a first ordered list including the first rule and the user-customized workflow data comprising a second ordered list including the second rule; and
generate, on the user interface, a visual notification to use the first rule in the model workflow data to replace the second rule in the user-customized workflow data.

9. The non-transitory computer-readable storage medium of claim 1, wherein the computer-language text of the first segment and of the second segment is in a domain-specific language (DSL).

10. The non-transitory computer-readable storage medium of claim 1, wherein the instructions are executable to cause the processor to identify a third segment in the first rule and a fourth segment in the second rule,
the third segment comprising a first string parameter and the second segment comprising a second string parameter,
wherein the first similarity score between the first and the second rules is further based on a comparison of the third segment with the fourth segment.

11. The non-transitory computer-readable storage medium of claim 1, wherein the instructions are executable to cause the processor to:
identify a third segment in the first rule and a fourth segment in the second rule, the third segment comprising a first map or list parameter and the second segment comprising a map or list parameter,
wherein the first similarity score between the first and the second rules is further based on a comparison of the third segment with the fourth segment.

12. The non-transitory computer-readable storage medium of claim 1, wherein the instructions are executable to cause the processor to:
identify a third segment in the first rule and a fourth segment in the second rule,
wherein the first segment and the second segment are part of condition clauses in the first and the second rules,
wherein the third segment and the fourth segment are part of action clauses in the first and the second rules, and
wherein the first similarity score between the first and the second rules is further based on a comparison of the third segment with the fourth segment.

13. A system comprising:
a processor; and
a memory comprising instructions executable by the processor to cause the processor to:
determine a first similarity score between a first rule in a model workflow data of an application and a second rule in a user-customized workflow data of the application, including instructions that cause the processor to:
identify a first segment in a condition clause or an action clause of the first rule and a second segment in a condition clause or an action clause of the second rule, determine a distance between the first segment and the second segment, determine a coefficient between the first segment and the second segment, and generate a sum of the distance and the coefficient between the first segment and the second segment as the first similarity score between the first rule and the second rule;

determine whether the first similarity score exceeds a first threshold; and in response to the first similarity score exceeding the first threshold, cause the first rule in the model workflow data to replace the second rule in the user-customized workflow data during a running of the application.

14. A method comprising:

identifying, by a processor of a computing device, a first segment in a first rule in a model workflow data of an application and a second segment in a second rule in a user-customized workflow data of the application, the first and the second segments including computer-language text;

determining, by the processor, a first similarity score between the first rule and the second rule, including:

determining a distance between the first segment and the second segment, determining a coefficient between the first segment and the second segment, and generating a sum of the distance and the coefficient between the first segment and the second segment as the first similarity score between the first rule and the second rule; and in response to the first similarity score exceeding a first threshold, causing, by the processor, the first rule in the model workflow data to replace the second rule in the user-customized workflow data during a running of the application.

15. The method of claim 14, comprising:

presenting, on a user interface, the first rule as a selectable option to replace the second rule;

receiving, via a user interface, a user selection of the first rule; and responsive to receipt of the user selection, execute user-customized workflow data using the first rule as a replacement of the second rule in the user-customized workflow data.

16. The method of claim 14, comprising:

presenting on a user interface:

a visual representation of the model workflow data comprising a first ordered list including the first rule, and a visual representation of the user-customized workflow data comprising a second ordered list including the second rule.

17. The non-transitory computer-readable storage medium of claim 1, comprising instructions to:

present, on a user interface, the first rule as a selectable option to replace the second rule;

receive, via the user interface, a user selection of the first rule; and responsive to receipt of the user selection, execute the user-customized workflow data using the first rule as a replacement of the second rule.

18. The system of claim 13, wherein the instructions are executable by the processor to cause the processor to:

generate a visual notification on a user interface to indicate that the first rule is selectable;

receive, via the user interface, a user selection to use the first rule; and responsive to receipt of the user selection, execute the user-customized workflow data using the first rule as a replacement of the user-customized workflow data.

19. The system of claim 13, wherein the instructions are executable by the processor to:

present on a user interface:

a visual representation of the model workflow data comprising a first ordered list including the first rule, and a visual representation of the user-customized workflow data comprising a second ordered list including the second rule.

* * * * *